United States Patent
Lin et al.

(10) Patent No.: US 11,922,578 B2
(45) Date of Patent: Mar. 5, 2024

(54) METHOD FOR ADJUSTING POINT CLOUD DENSITY, ELECTRONIC DEVICE, AND STORAGE MEDIUM

(71) Applicant: HON HAI PRECISION INDUSTRY CO., LTD., New Taipei (TW)

(72) Inventors: Jung-Yi Lin, New Taipei (TW); Chieh Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 86 days.

(21) Appl. No.: 17/846,228

(22) Filed: Jun. 22, 2022

(65) Prior Publication Data

US 2022/0414987 A1 Dec. 29, 2022

(30) Foreign Application Priority Data

Jun. 29, 2021 (CN) .......................... 202110728238.6

(51) Int. Cl.
*G06T 17/20* (2006.01)
*G06T 19/20* (2011.01)
*G06T 7/73* (2017.01)

(52) U.S. Cl.
CPC .............. *G06T 17/205* (2013.01); *G06T 7/75* (2017.01); *G06T 19/20* (2013.01); *G06T 2207/10028* (2013.01); *G06T 2207/20021* (2013.01); *G06T 2207/20076* (2013.01); *G06T 2219/2024* (2013.01)

(58) Field of Classification Search
CPC ......... G06T 17/205; G06T 7/75; G06T 19/20; G06T 2207/10028; G06T 2207/20021; G06T 2207/20076; G06T 2219/2024; G06T 9/001; G06T 2207/30261; G06T 7/50; G06T 7/12; G06T 7/11; G06T 7/13

See application file for complete search history.

(56) References Cited

U.S. PATENT DOCUMENTS

| 2018/0225866 A1* | 8/2018 | Zhang | G06T 7/593 |
| 2019/0219700 A1* | 7/2019 | Coombe | G01S 17/86 |
| 2020/0293751 A1* | 9/2020 | Zeng | G01C 21/20 |
| 2020/0327646 A1* | 10/2020 | Xu | G06T 5/20 |

FOREIGN PATENT DOCUMENTS

CN 112329789 A * 2/2021 ............... G06K 9/46

\* cited by examiner

*Primary Examiner* — Maurice L. McDowell, Jr.
(74) *Attorney, Agent, or Firm* — ScienBiziP, P.C.

(57) ABSTRACT

A method for adjusting point cloud density, an electronic device, and a storage medium are provided. In the method an initial point cloud map and a distance determination threshold of a robot are obtained. A plurality of target regions in the initial point cloud map are determined, and an environmental complexity value of each target region is calculated. The initial point cloud map is divided into submaps, and a point cloud density coefficient of each submap is determined. The initial point cloud map is adjusted according to the point cloud density coefficient and the target point cloud map is obtained. By utilizing such method, adjustment efficiency and an accuracy of point cloud density can be improved.

20 Claims, 4 Drawing Sheets

METHOD FOR ADJUSTING POINT CLOUD DENSITY, ELECTRONIC DEVICE, AND STORAGE MEDIUM

FIELD

The present application relates to a technical field of point cloud processing, and more particularly to a method for adjusting point cloud density, an electronic device, and a storage medium.

BACKGROUND

A point cloud map can express an outline and specific locations of objects. Generally, a point cloud map is large in scale and requires a lot of storage space. For example, an image with a resolution of 640*480 may have about 300,000 spatial points. However, many spatial points may be redundant, thus storage spaces of excessive spatial points are wasted and more calculations have to be executed. If point clouds in the point cloud map are too dense, a lot of computing resources and storage space are occupied. On the other hand, if the point cloud is too sparse, the space between the points in the point cloud map is difficult to describe clearly, and it becomes un-useful for identifying objects in images.

DETAILED DESCRIPTION

The accompanying drawings combined with the detailed description illustrate the embodiments of the present application hereinafter. It is noted that embodiments of the present application and features of the embodiments can be combined, when there is no conflict.

Various details are described in the following descriptions for a better understanding of the present application, however, the present application may also be implemented in other ways other than those described herein. The scope of the present application is not to be limited by the specific embodiments disclosed below. Unless defined otherwise, all technical and scientific terms used herein have the same meaning as commonly understood by one of ordinary skill in the art to which the present application belongs. The terms used herein in the present application are only for the purpose of describing specific embodiments and are not intended to limit the present application.

Figure 1:
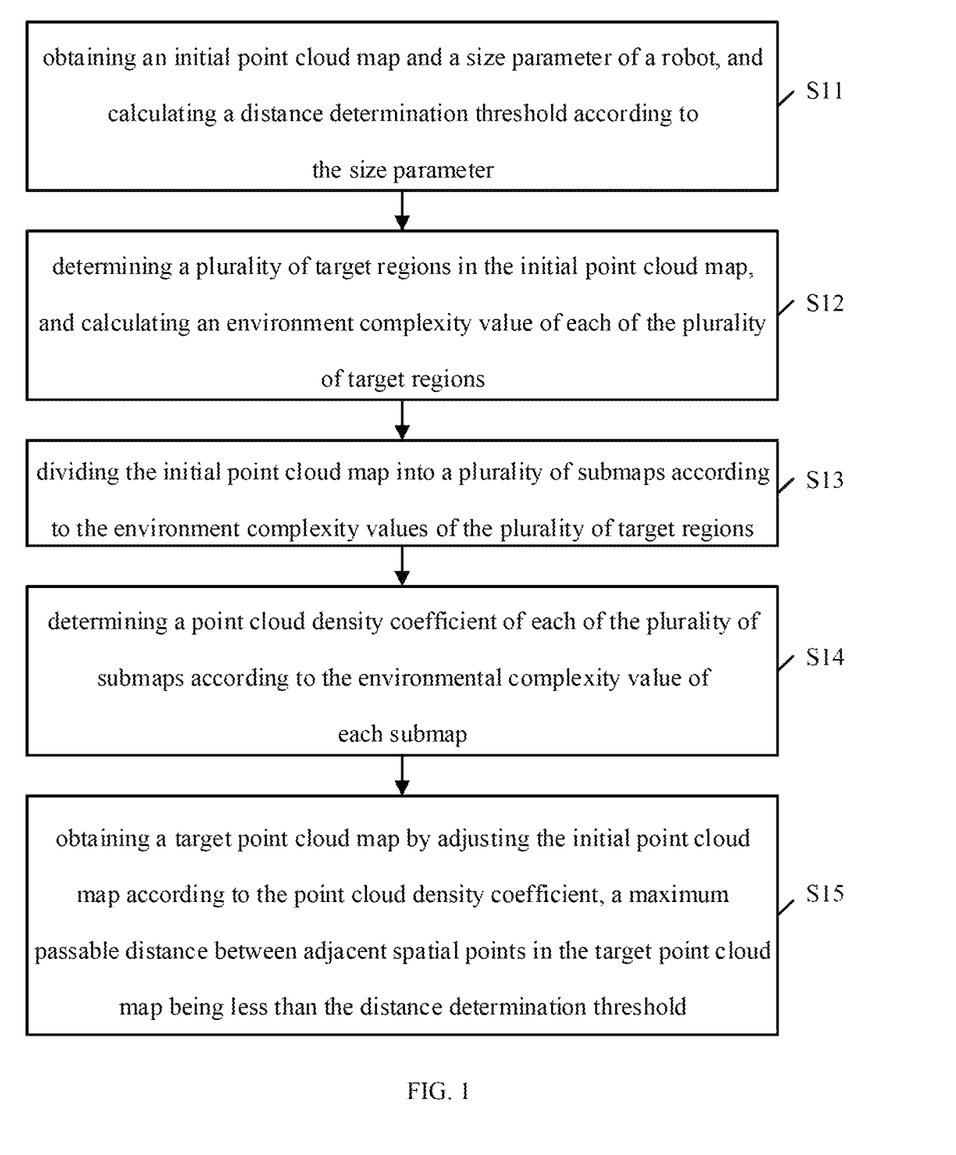
FIG. 1 is a flowchart diagram of a method for adjusting point cloud density provided in an embodiment of the present application.

FIG. 1 is a flowchart of a method for adjusting point cloud density provided in an embodiment of the present application.

In one embodiment, the method is applied to an electronic device. For an electronic device that can adjust a point cloud density, functions for executing the method for adjusting the point cloud density can be directly integrated in the electronic device, or can be run in the electronic device as a software development kit (SDK).

As shown in FIG. 1, the method according to an embodiment of the present application includes the steps as provided below.

In block S11, the electronic device obtains an initial point cloud map and a size of a robot, and calculates a distance determination threshold according to the size.

In one embodiment, when a point cloud density is required to be adjusted, a user may request a point cloud density adjustment from a client device (e.g., a computer) to the electronic device. Specifically, the client device may be a smart phone, a tablet computer, or other smart devices. For example, during a point cloud density adjustment process, the client device sends a point cloud density adjustment request to the electronic device, and the electronic device receives the point cloud density adjustment request sent by the client device.

In one embodiment, the electronic device receives the point cloud density adjustment request, and obtains an initial point cloud map and a size of a robot by parsing the point cloud density adjustment request. For example, the robot may be a sweeping robot, a robot dog, a robot cat, or other smart robot. The dimensions of the robot may include, but are not limited to, a length, a width and a height of the robot, for example.

In one embodiment, a distance determination threshold may be used to determine a distance between adjacent points in space of the initial point cloud map according to the size of the robot.

In at least one embodiment, the electronic device determines a maximum permissible distance that the robot is able to move through according to its size, and obtains a preset distance coefficient. The electronic device determines the distance determination threshold by calculating a product of the maximum permissible distance and the preset distance coefficient.

In one embodiment, the maximum permissible distance that the robot can pass through the adjacent points in space in the initial point cloud map is calculated according to the size of the robot in advance.

In one embodiment, a distance coefficient can be preset, for example, a preset distance coefficient can be a random number between 0 and 1. The electronic device obtains the preset distance, and determines the distance determination threshold of the initial point cloud map according to the preset distance coefficient and the maximum permissible distance.

In block S12, the electronic device determines a plurality of target regions in the initial point cloud map, and calculates an environmental complexity value of each of the plurality of target regions.

In one embodiment, the target regions in the initial point cloud map are determined according to a sliding window or an identification algorithm.

In at least one embodiment, the electronic device performs a non-overlapping sliding operation on the initial point cloud map using a sliding window, and determines a corresponding region each time when the preset sliding window slides over the initial point cloud map. The determined region is regarded as the target region on the initial point cloud map.

In one embodiment, a sliding window and sliding methods may be preset. Specifically, the sliding window may be set to be (h×w), in which h represents a length of each sliding window, x represents a width of each sliding window, the length and the width of each sliding window can be set according to user's requirements. In the preset sliding method, the sliding window may be slid from left to right on the initial point cloud map or from top to bottom on the initial point cloud map. The preset sliding method may be preset according to user requirements, it is not limited in any embodiment.

In at least one embodiment, the electronic device identifies target objects on the initial point cloud map according to an identification algorithm, and determines a region corresponding to each of the target objects as the target region on the initial point cloud map.

In one embodiment, the identification algorithm can be used to identify all target objects from the initial point cloud map, and a depth value corresponding to each pixel of each of the target objects is read. Since the depth values of different target objects may be different, the electronic device determines each of the target objects as a target region, calculates a standard deviation of all depth values of all pixels in the target region, and obtains a standard deviation of the target region. Thus, a standard deviation which is inaccurate caused by dividing the plurality of target objects into one target region is avoided, and an accuracy of the standard deviation of the target region is improved.

In at least one embodiment, the electronic device obtains a depth value of a pixel of each of the target regions, and obtains a standard deviation of each of the target regions by calculating a standard deviation of the depth value of the pixel. The electronic device determines an environmental complexity value of each of the target regions according to the standard deviation.

In one embodiment, a standard deviation represents a degree of dispersion between spatial points in each target region. For example, when the depth of the pixels in the target region is close to a linear distribution, then the standard deviation is small, and a surface of the target region is relatively smooth. When the depth of the pixels in the target region is relatively discrete, that is, the standard deviation is large, and the surface of the target region is deemed not smooth.

In one embodiment, a database can be preset, and the environmental complexity value of each of the target regions corresponding to the standard deviation of each of the target regions is matched with the standard deviation in the preset database, and the target standard deviation is obtained. The environmental complexity value of the target standard deviation represents an environmental complexity value of a corresponding target region.

In block S13, the electronic device divides the initial point cloud map into a plurality of submaps according to the environmental complexity values of the plurality of target regions.

In one embodiment, since the different complexities of sliding window regions have different standard deviations, the initial cloud map is divided according to the standard deviation of the sliding window, the consistency of the environmental complexity value of each of the plurality of submaps after dividing is thereby guaranteed.

In at least one embodiment, the electronic device determines whether the environmental complexity values of adjacent target regions meet a preset division requirement. In response that the preset division requirement is met, the electronic device divides the adjacent target regions into two submaps. In response that the preset division requirement is not met, the electronic device merges such adjacent target regions into one submap.

In one embodiment, when the initial point cloud map is divided, the electronic device determines whether environmental complexity values of adjacent target regions meet a preset division requirement, and determines whether the standard deviations of adjacent target regions are close to each other. In response that the standard deviations of adjacent target regions are not close, the environmental complexity values of adjacent target regions may have large differences, and each sliding window is regarded as a submap. In response that the standard deviations of adjacent target regions are close together, the environmental complexity values of the adjacent target regions are almost the same, and such adjacent target regions are merged into one submap. Thus, a number of the submaps is reduced, and an efficiency and an accuracy of point cloud density adjustment are improved.

In block S14, the electronic device determines a point cloud density coefficient of each of the plurality of submaps according to the environmental complexity value of each submap.

In one embodiment, S represents the point cloud density coefficient. In formula of $S \in (0,1)$, "S=1" indicates that an interval or distance between adjacent spatial points in each submap is a maximum value. When S is smaller, this means the point cloud is denser.

In at least one embodiment, the electronic device divides the environmental complexity value into a plurality of environmental complexity levels according to a preset division rule, and determines a point cloud density coefficient for each submap according to the plurality of environmental complexity levels.

In one embodiment, since a standard deviation represents a degree of dispersion between spatial points in each target region, the environmental complexity value of the target region may be determined according to the standard deviation. In response that the standard deviation of each submap is smaller, the surface of such region of each submap is smoother and the environment is less complicated. In response that the standard deviation of each submap is greater, the surface of such region of each submap is less smooth and has greater fluctuations, thus the environment is more complicated.

In one embodiment, a division rule can be preset, and the environmental complexity values of the plurality of submaps may be divided into a plurality of environmental complexity levels according to the preset division rule, each of the environmental complexity levels may include one or more submaps. When determining a point cloud density coefficient for each submap, adjustment of the point cloud map density is inefficient. But in the above embodiments, inefficient adjustments are avoided, and the accuracy and efficiency of the point cloud density adjustment can be improved.

Figure 2:
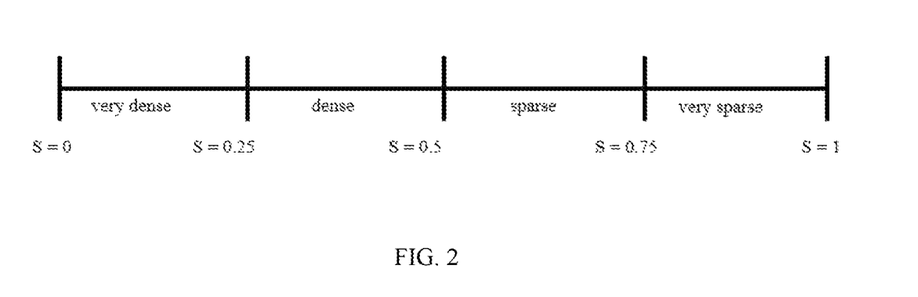
FIG. 2 is a diagram of an environmental complexity level provided in an embodiment of the present application.

FIG. 2 shows environmental complexity levels in an embodiment of the present application. As shown in FIG. 2, environmental complexity values of the submap can be classified into a plurality of levels according to the user's requirements. The plurality of levels may include first to fourth environmental complexity levels. For example, the first environmental complexity level represents very dense points, the second environment complexity level represents dense, the third environment complexity level represents sparse, the fourth environment complexity level represents very sparse points. Classifications of the plurality of levels may be determined according to preset thresholds or ranges.

For example, when a point cloud density coefficient of a submap is 0.25, the environmental complexity level is determined to be very dense. When a point cloud density coefficient of a submap is 0.5, the environmental complexity level is determined to be dense. When a point cloud density coefficient of a submap is 0.75, the environmental complexity level is determined to be sparse. When a point cloud density coefficient of a submap is 1, the environmental complexity level is determined to be very sparse.

In block S15, the electronic device obtains a target point cloud map by adjusting the initial point cloud map according to the point cloud density coefficient. In one embodiment, a maximum distance between adjacent spatial points in the target point cloud map may be less than the distance determination threshold.

In one embodiment, a target point cloud map is the initial point cloud map after the density adjustment, and a density of each of the submaps is adjusted according to the distance determination threshold and the point cloud density coefficient of each of the submaps. Overdense or oversparse point cloud density in each submap is avoided, and an accuracy of a point cloud density adjustment and a usage of a point cloud map are improved.

In one embodiment, in response that a point cloud density of each of the submaps is adjusted, the distance between adjacent spatial points in each of the submaps is adjusted according to the point cloud density coefficient of each of the submaps. The adjusted maximum distance of adjacent space points is less than the distance determination threshold, avoiding an overlarge robot or a robot which is unable to avoid obstacles or to navigate erroneously by mistake as to adjacent points, and improving the adjustment accuracy and usage of point cloud maps.

For example, a distance determination threshold is set to 7 mm, as shown in FIG. 2, the initial point cloud map is divided into at least four levels, such as very dense, dense, sparse and very sparse, according to the environmental complexity value. "S=0.25" indicates that the environmental complexity level is very dense, and the distance between adjacent spatial points in the corresponding submap is adjusted to be 7×0.25 mm=1.75 mm. "S=0.5" indicates that the environmental complexity level is dense, and the distance between adjacent spatial points in the corresponding submap is adjusted to be 7×0.5 mm=3.5 mm.

Figure 3:
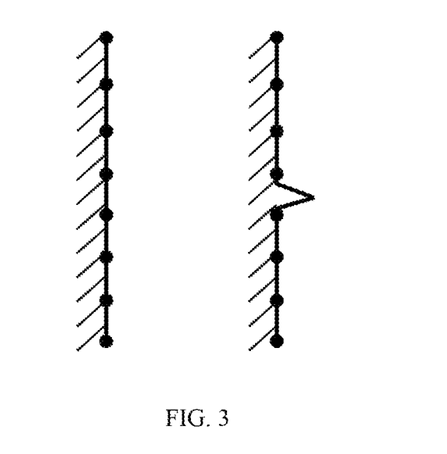
FIG. 3 is a first schematic diagram of sparse point clouds in an embodiment of the present application.
Figure 4:
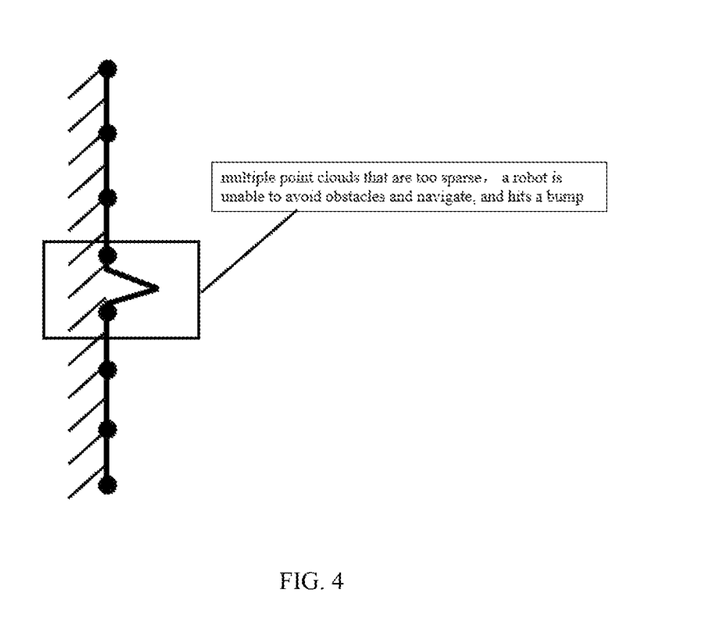
FIG. 4 is a second schematic diagram of sparse point clouds in an embodiment of the present application.
Figure 5:
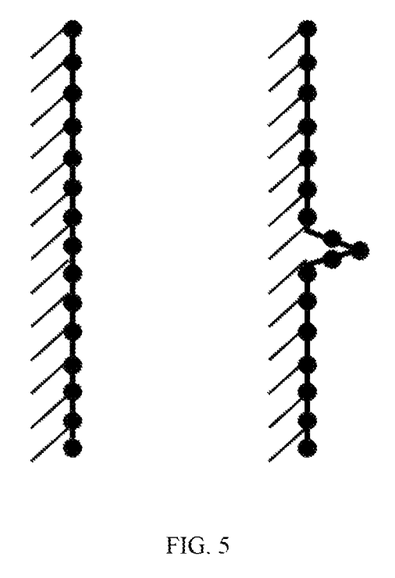
FIG. 5 is a first schematic diagram of dense point clouds in an embodiment of the present application.
Figure 6:
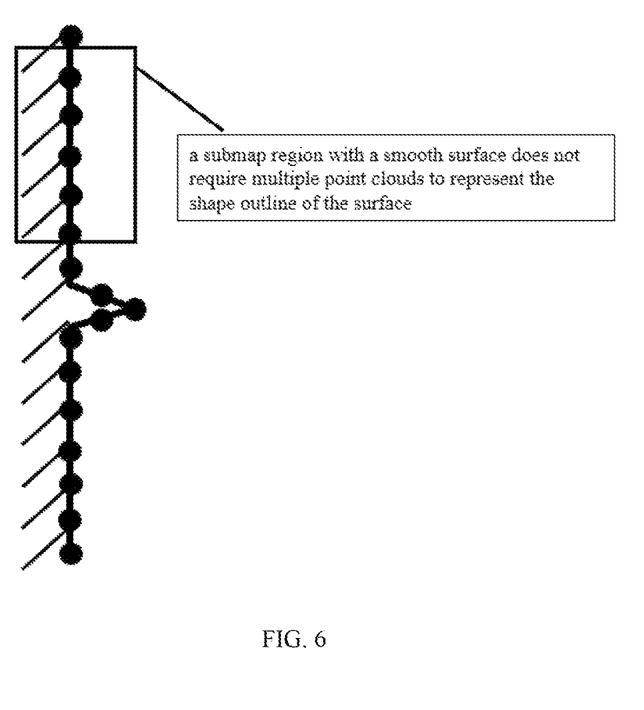
FIG. 6 is a second schematic diagram of dense point cloud in an embodiment of the present application.

In one embodiment, as shown in FIGS. 3 and 4, when a point cloud map with oversparse points is used, the space between adjacent spatial points in the point cloud map may be too large to describe the bulge of a wall. The robot cannot avoid obstacles or bumps, and cannot navigate accurately. In response that a point cloud are too dense in points, there is an unnecessary increase in computational storage space. For example, as shown in FIGS. 5 and 6, a submap region with a smooth surface does not require multiple points in the cloud to represent the shape outline of the surface. The target point cloud map is obtained by automatically adjusting the density of the initial point cloud map according to the environmental complexity value, thereby avoiding the problem that multiple points are too sparsely distributed and the space between the points in the point cloud map cannot be described, and avoiding too many points in the cloud which can occupy a lot of computing resources and storage space.

Figure 7:
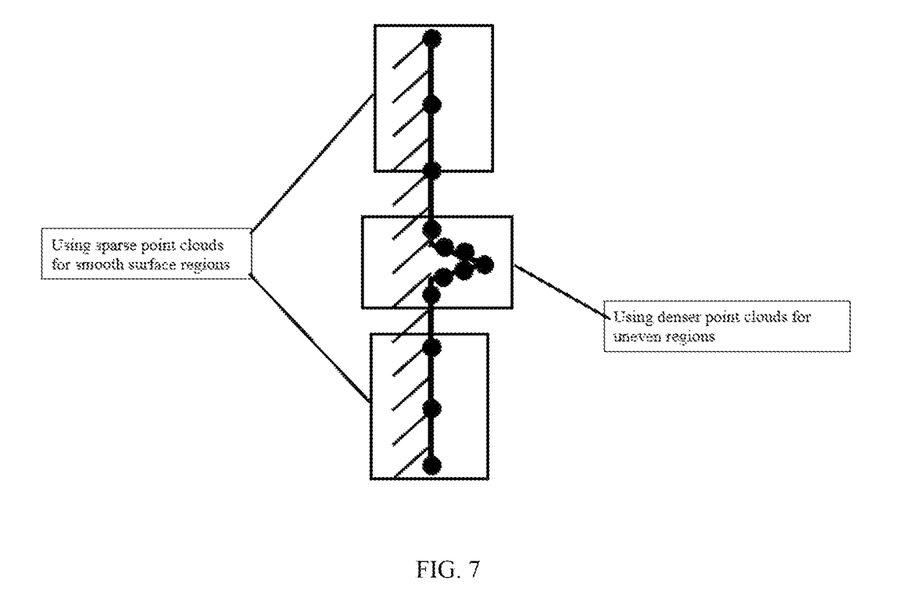
FIG. 7 is a schematic diagram of a target point cloud map adjusted by performing the method of FIG. 1, in an embodiment of the present application.

FIG. 7 is a schematic diagram of a target point cloud map adjusted by performing the method of FIG. 1, in an embodiment of the present application. As shown in FIG. 7, the electronic device adjusts the density of adjacent spatial points in a smooth surface region to be sparsely distributed, and adjusts the density of adjacent spatial points in an uneven surface region to be denser. Thus, an accuracy and efficiency of point cloud density adjustment can be improved.

The method for adjusting point cloud density is used to divide the initial point cloud map into a plurality of submaps according to the environmental complexity values of the plurality of target regions. Since the different complexities of sliding window regions have different standard deviations, the initial cloud map is divided according to the standard deviation of the sliding window, the consistency of the environmental complexity value of each submap after dividing is guaranteed. In the method, the electronic device further merges adjacent target regions which have the same environmental complexity into one submap, thereby reducing a number of submaps and improving efficiency and accuracy of point cloud density adjustment. On the one hand, the point cloud density coefficient of each submap is determined according to the environmental complexity value of each submap. During the determination process, the environmental complexity value of the submaps may be divided into a plurality of environmental complexity levels, and each environmental complexity level may include one or more submaps. When determining a point cloud density coefficient for each submap, adjustment of point cloud map density is inefficient. According to the above embodiments, such inefficient adjustment can be avoided, and the accuracy and efficiency of the point cloud density adjustment can be improved, and an accuracy and efficiency of the point cloud density adjustment are improved. The electronic device obtains a target point cloud map by adjusting the initial point cloud map according to the point cloud density coefficient, a maximum distance between adjacent spatial points in the target point cloud map being less than the distance determination threshold, thereby avoiding oversparsity and overdenseness in each submap, and improving an accuracy of a point cloud density adjustment and a usage of a point cloud map.

Figure 8:
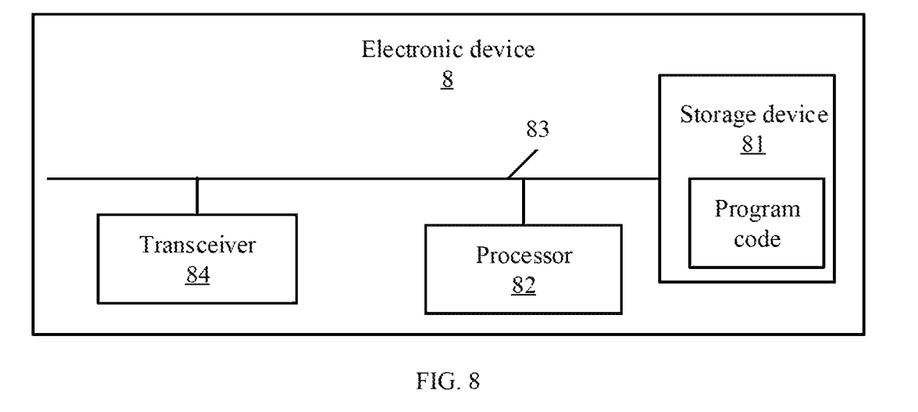
FIG. 8 is a structural diagram of an electronic device for adjusting point cloud density provided in an embodiment of the present application.

FIG. 8 is a structural diagram of an electronic device in an embodiment of the present application.

The electronic device 8 can include, but is not limited to, a storage device 81, at least one processor 82, at least one communication bus 83, and a transceiver 84.

Those skilled in the art should understand that the structure of the electronic device shown in FIG. 8 does not constitute a limitation of the embodiment of the present invention. It may be a bus-type structure or a star structure. The electronic device 8 may also include more or less other hardware or software, or different component arrangements.

In one embodiment, the electronic device 8 is a terminal device that can automatically perform numerical calculation and/or information processing in accordance with pre-set or stored instructions, its hardware includes, but is not limited to, a microprocessor, an application specific integrated circuit, a programmable gate array, digital processors and embedded devices, etc. The electronic device 8 may also include a customer device. The customer device includes, but is not limited to, any electronic product that can interact with a customer through a keyboard, a mouse, a remote control, a touch panel, or a voice control device, for example, personal computers, tablets, smartphones, digital cameras, etc.

It should be noted that the electronic device 8 is only an example, and other existing or future electronic products that can be adapted to the present invention should also be included in the protection scope of the present invention and included here by reference.

The storage device 81 can be used to store the program segment. The processor 82 operates or executes the program segment stored in the storage device 81 and recalls data stored in the storage device 81, and implements various functions of the electronic device 8. The storage device 81 may include a storage program area and a storage data area, the storage program area may store an operating system, and an application (such as sound playback and image playback) required for at least one function. The storage data area may store data created.

The storage device 81 may include a read-only memory (ROM), a programmable read-only memory (PROM), and an erasable programmable read-only memory (EPROM), One-time Programmable Read-Only Memory (OTPROM), Electronically-Erasable Programmable Read-Only Memory (EEPROM), and Compact Disc Read-Only Memory (CD-ROM) or other optical disk storage, magnetic disk storage, tape storage, or any other storage medium that can be used to carry or store data.

In some embodiments, the at least one processor 82 may be composed of integrated circuits, for example, may be composed of a single packaged integrated circuit, or may be composed of multiple integrated circuits with the same function or different functions, including one or a combination of multiple central processing units (CPUs), microprocessors, digital processing chips, graphics processors, and various control chips. The at least one processor 82 is the control core of the electronic device 8, which uses various interfaces and lines to connect the various components of the entire terminal device 8, and runs or executes programs stored in the storage device 81 or modules, and calls up data stored in the storage device 81 to perform various functions and process data of the electronic device 8.

In some embodiments, the at least one communication bus 83 is configured to implement connection and communication between the storage device 81 and the at least one processor 82 and the like.

Although not shown, the electronic device 8 may also include a power source (such as a battery) for supplying power to various components. The power source may be logically connected to the at least one processor 82 through a power management device, thereby realizing functions such as managing charging, discharging, and power consumption. The power supply may also include any components such as one or more DC or AC power supplies, recharging devices, power failure detection circuits, power converters or inverters, and power status indicators. The electronic device 8 may also include a variety of sensors, BLUETOOTH modules, WI-FI modules, which will not be repeated here.

The above-mentioned integrated unit implemented in the form of a software function modules may be stored in a computer readable storage medium. The above-mentioned software function modules are stored in a storage medium and include several instructions to make a computer device (which may be a personal computer, terminal device, or network device, etc.) or a processor execute the method described in each embodiment of the present invention.

In an embodiment of the present invention, the storage device 81 stores a plurality of instructions, and the plurality of instructions are executed by the at least one processor 82 to realize the function of transaction processing.

Specifically, for the specific implementation method of the at least one processor 82 on the foregoing instructions, reference may be made to the description of the relevant steps in the embodiments of FIG. 1 to FIG. 6b, which will not be repeated here.

In some embodiments provided by the present invention, it should be understood that the disclosed device and method can be implemented in other ways. For example, the device embodiments described above are merely illustrative. For example, the division of the modules is only a logical function division, and there may be other division methods in actual implementation.

The modules described as separate components may or may not be physically separated, and the components displayed as modules may or may not be physical units, and may be located in one place or distributed on multiple networks. Some or all of the modules can be selected according to actual needs to achieve the purpose of the method.

In addition, the functional modules in the various embodiments of the present invention may be integrated into one processing unit, or each unit may exist alone physically, or two or more units may be integrated into one unit. The above-mentioned integrated unit can be realized either in the form of hardware or in the form of hardware plus software functional modules.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for adjusting point cloud density, the method comprising:
    obtaining an initial point cloud map and a size parameter of a robot, and calculating a distance determination threshold according to the size parameter;
    determining a plurality of target regions in the initial point cloud map, and calculating an environment complexity value of each of the plurality of target regions;
    dividing the initial point cloud map into a plurality of submaps according to the environment complexity values of the plurality of target regions;
    determining a point cloud density coefficient of each of the plurality of submaps according to the environmental complexity value of each submap; and
    obtaining a target point cloud map by adjusting the initial point cloud map according to the point cloud density coefficient, a maximum passable distance between adjacent spatial points in the target point cloud map being less than the distance determination threshold.

2. The method of claim 1, wherein determining a plurality of target regions in the initial point cloud map comprises:
    performing a non-overlapping sliding on the initial point cloud map using a preset sliding window, and determining a corresponding region each time when the preset sliding window is slided on the initial point cloud map, the determined region being regarded as the target region on the initial point cloud map.

3. The method of claim 1, wherein determining a plurality of target regions in the initial point cloud map comprises:

identifying target objects on the initial point cloud map according to an identification algorithm, and determining a region corresponding to each of the target objects as the target region on the initial point cloud map.

4. The method of claim 3, wherein calculating an environment complexity value of each of the plurality of target regions comprises:
obtaining a depth value of a pixel of each of the plurality of target regions;
obtaining a standard deviation of each of the plurality of target regions by calculating a standard deviation of the depth value of the pixel;
determining an environmental complexity value of each of the plurality of target regions according to the standard deviation.

5. The method of claim 4, wherein dividing the initial point cloud map into a plurality of submaps according to the environment complexity values of the plurality of target regions comprises:
determining whether the environmental complexity values of adjacent target regions meet a preset division requirement;
in response that the environmental complexity values of the adjacent target regions meet the preset division requirement, dividing the adjacent target regions into two submaps.

6. The method of claim 4, further comprising:
in response that the environmental complexity values of the adjacent target regions do not meet the preset division requirement, merging the adjacent target regions into a same submap.

7. The method of claim 1, wherein determining a point cloud density coefficient of each of the plurality of submaps according to the environmental complexity value of each submap comprises:
dividing the environment complexity value into a plurality of environment complexity levels according to a preset division rule;
determining a point cloud density coefficient for each submap according to the plurality of environment complexity levels.

8. The method of claim 1, wherein calculating a distance determination threshold according to the size parameter comprises:
determining a maximum passable distance that the robot is able to pass according to the size parameter;
obtaining a preset distance coefficient;
determining the distance determination threshold by calculating a product of the maximum passable distance and the preset distance coefficient.

9. An electronic device comprising:
a processor; and
a storage device storing a plurality of instructions, which when executed by the processor, cause the processor to:
obtain an initial point cloud map and a size parameter of a robot, and calculate a distance determination threshold according to the size parameter;
determine a plurality of target regions in the initial point cloud map, and calculate an environment complexity value of each of the plurality of target regions;
divide the initial point cloud map into a plurality of submaps according to the environment complexity values of the plurality of target regions;
determine a point cloud density coefficient of each of the plurality of submaps according to the environmental complexity value of each submap; and
obtain a target point cloud map by adjusting the initial point cloud map according to the point cloud density coefficient, a maximum passable distance between adjacent spatial points in the target point cloud map being less than the distance determination threshold.

10. The electronic device of claim 9, wherein the processor is further caused to:
perform a non-overlapping sliding on the initial point cloud map using a preset sliding window, and determine a corresponding region each time when the preset sliding window is slided on the initial point cloud map, the determined region being regarded as the target region on the initial point cloud map.

11. The electronic device of claim 9, wherein the processor is further caused to:
identify target objects on the initial point cloud map according to an identification algorithm, and determine a region corresponding to each of the target objects as the target region on the initial point cloud map.

12. The electronic device of claim 11, wherein the processor is further caused to:
obtain a depth value of a pixel of each of the plurality of target regions;
obtain a standard deviation of each of the plurality of target regions by calculating a standard deviation of the depth value of the pixel;
determine an environmental complexity value of each of the plurality of target regions according to the standard deviation.

13. The electronic device of claim 12, wherein the processor is further caused to:
determine whether the environmental complexity values of adjacent target regions meet a preset division requirement;
in response that the environmental complexity values of the adjacent target regions meet the preset division requirement, divide the adjacent target regions into two submaps.

14. The electronic device of claim 9, wherein the processor is further caused to:
divide the environment complexity value into a plurality of environment complexity levels according to a preset division rule;
determine a point cloud density coefficient for each submap according to the plurality of environment complexity levels.

15. A non-transitory storage medium having stored thereon at least one computer-readable instructions that, when executed by a processor of an electronic device, causes the processor to perform a method for adjusting point cloud density, the method comprising:
obtaining an initial point cloud map and a size parameter of a robot, and calculating a distance determination threshold according to the size parameter;
determining a plurality of target regions in the initial point cloud map, and calculating an environment complexity value of each of the plurality of target regions;
dividing the initial point cloud map into a plurality of submaps according to the environment complexity values of the plurality of target regions;
determining a point cloud density coefficient of each of the plurality of submaps according to the environmental complexity value of each submap; and
obtaining a target point cloud map by adjusting the initial point cloud map according to the point cloud density coefficient, a maximum passable distance between adjacent spatial points in the target point cloud map being less than the distance determination threshold.

16. The non-transitory storage medium of claim 15, wherein determining a plurality of target regions in the initial point cloud map comprises:

performing a non-overlapping sliding on the initial point cloud map using a preset sliding window, and determining a corresponding region each time when the preset sliding window is slided on the initial point cloud map, the determined region being regarded as the target region on the initial point cloud map.

17. The non-transitory storage medium of claim 15, wherein determining a plurality of target regions in the initial point cloud map comprises:

identifying target objects on the initial point cloud map according to an identification algorithm, and determining a region corresponding to each of the target objects as the target region on the initial point cloud map.

18. The non-transitory storage medium of claim 17, wherein calculating an environment complexity value of each of the plurality of target regions comprises:

obtaining a depth value of a pixel of each of the plurality of target regions;

obtaining a standard deviation of each of the plurality of target regions by calculating a standard deviation of the depth value of the pixel;

determining an environmental complexity value of each of the plurality of target regions according to the standard deviation.

19. The non-transitory storage medium of claim 18, wherein dividing the initial point cloud map into a plurality of submaps according to the environment complexity values of the plurality of target regions comprises:

determining whether the environmental complexity values of adjacent target regions meet a preset division requirement;

in response that the environmental complexity values of the adjacent target regions meet the preset division requirement, dividing the adjacent target regions into two submaps.

20. The non-transitory storage medium of claim 15, wherein determining a point cloud density coefficient of each of the plurality of submaps according to the environmental complexity value of each submap comprises:

dividing the environment complexity value into a plurality of environment complexity levels according to a preset division rule;

determining a point cloud density coefficient for each submap according to the plurality of environment complexity levels.

* * * * *